Jan. 11, 1966  W. H. SARGENT ET AL  3,228,188
THRUST-VECTOR CONTROL SYSTEM
Filed March 29, 1963  3 Sheets-Sheet 1

INVENTORS
William H. Sargent &
James R. MacPherson
BY
Martha L. Ross
AGENT

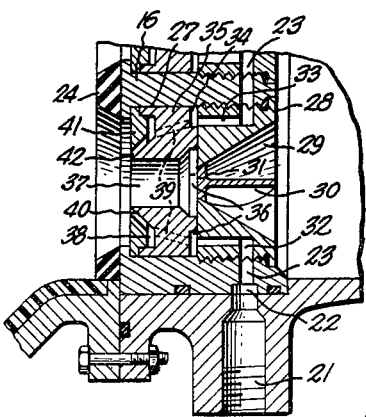
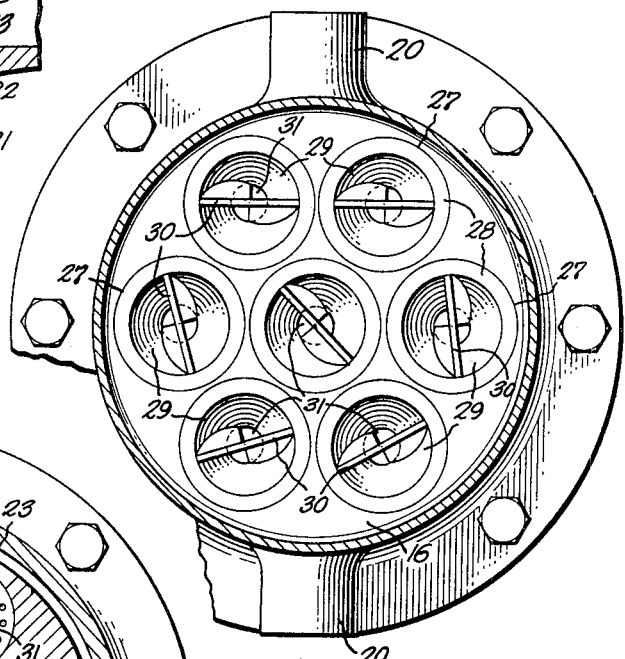
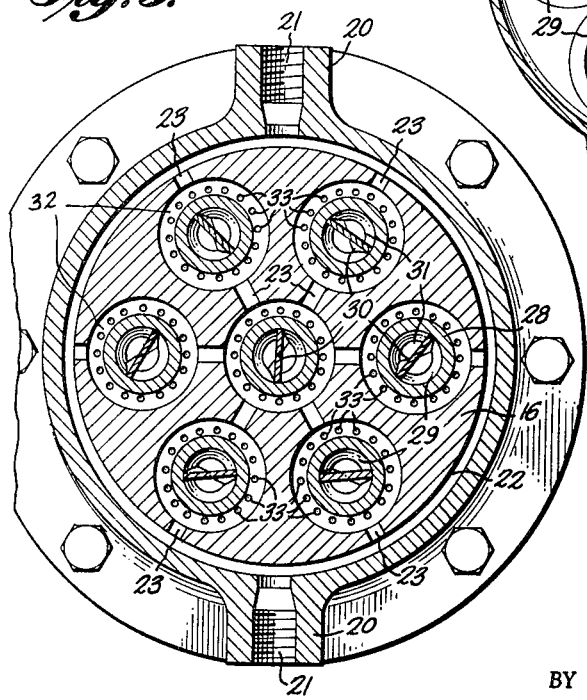

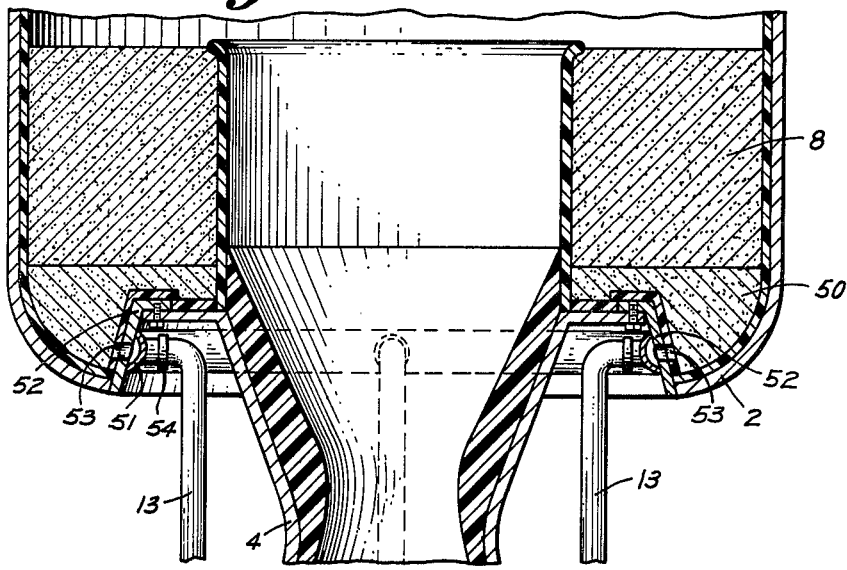
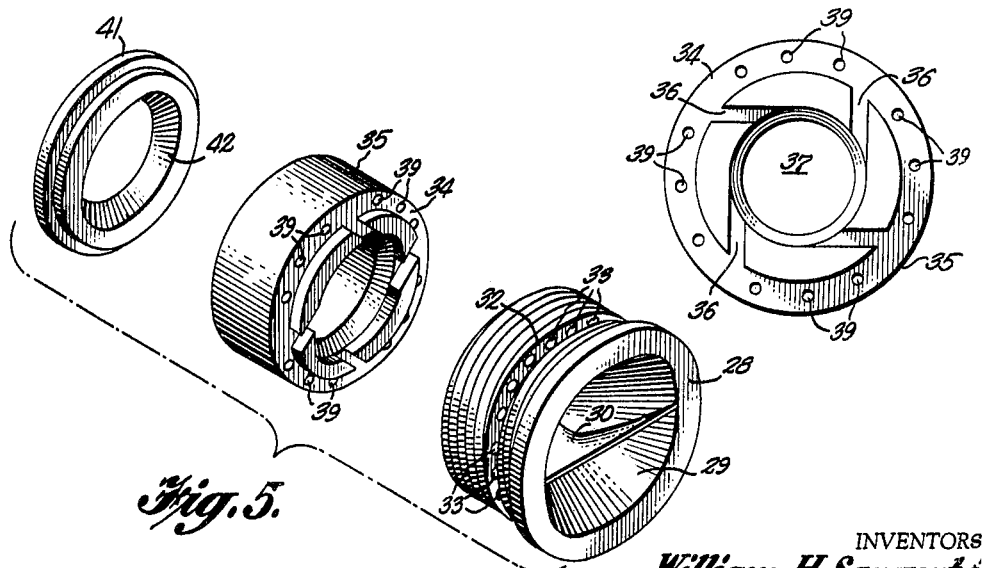

United States Patent Office 3,228,188
Patented Jan. 11, 1966

3,228,188
THRUST-VECTOR CONTROL SYSTEM
William H. Sargent, Annandale, and James R. MacPherson, Falls Church, Va., assignors to Atlantic Research Corporation, Fairfax, Va., a corporation of Virginia
Filed Mar. 29, 1963, Ser. No. 269,852
20 Claims. (Cl. 60—35.54)

This invention relates to a thrust-vector-control system for controlling the attitude of a rocket or space vehicle and, in particular, to a secondary hot-gas injection control system wherein the hot gases are injected transversely into the flow path of the exhaust gases flowing through the rocket nozzle. The shock wave created in the nozzle and the reactive effect of the hot-gas injection result in a total side force sufficient to turn the rocket.

Various systems for controlling the attitude of a missile or rocket by thrust-vectoring techniques have been developed. These can be divided into two main types: First, there is the mechanical system, which includes such apparatus as swiveling or rotating nozzles, jetevators and similar apparatus, where by mechanical movement the thrust of the rocket is redirected. Second, there is the injection system which includes such methods as injecting a gas or liquid into the rocket nozzle, whereby a side force is generated. This latter type of thrust-vector control is the type to which this invention relates, and is known as secondary injection.

A general understanding of the effects of secondary injection can be obtained by referring to a convergent-divergent, or DeLaval-type nozzle. It will be assumed that conditions are such that aft of the nozzle throat the primary flow of exhaust gas is in the supersonic region. When the flow adjacent to the nozzle wall is disturbed by the injection of a gas or liquid to such an extent that the boundary layer separates from the surface, a shock wave will be generated which will propagate outwardly from the wall. As the exhaust gas passes through this shock wave it is deflected, and a side force is generated which is proportional to the angular deflecttion of this exhaust gas. This shock wave side force plus the side force caused by the reactive effect of the injected gas itself combine to give the total side force. Viewed in another light this shock wave effect can be considered as an "amplification" of the reactive side force.

In the case of a liquid or a cold-gas secondary-injection system, considerable amplification is possible. However, due to the penalty incurred by the weight of the injection system and the weight of the injectant and its storage means, hot-gas injection is more feasible since theoretically it will provide an overall weight saving and also provide a greater reactive side force due to its high-energy level. In prior hot-gas secondary injection systems a portion of the gases generated in the rocket combustion chamber is piped to the divergent section of the main rocket nozzle and there injected. A drawback has been that valving capable of handling these high-temperature gases has been difficult to develop for use in a flight-weight missile system. The present invention eliminates this hot-gas valving problem by working with cold components throughout a major portion of the system.

Accordingly, it is an object of the invention to provide a thrust-vector control system employing secondary hot-gas injection.

Another object is to provide such a system which has the advantage of using cold components thus eliminating hot-gas valving problems.

A further object is to provide such a system which relies on the same propellant source as the main rocket motor.

A still further object is to provide such a system capable of a wide range of secondary gas generation and which has an unlimited start-stop capability at high response rates.

Other objects and advantages of the invention will be made obvious by a reading of the following description in conjunction with the drawings wherein:

FIGURE 2 is a downstream view of the inlet side of the gas generator extrusion member taken on line 2—2 of FIGURE 1.

FIGURE 3 is a cross-sectional view taken on line 3—3 of FIGURE 1.

FIGURE 4 is a longitudinal cross-sectional view of a nozzle assembly located in the extrusion member.

FIGURE 5 is an exploded view of a nozzle assembly.

FIGURE 6 is a downstream view of the vortex section of the nozzle assembly.

FIGURE 7 is a sectional view of a modification of the apparatus shown in FIGURE 1.

Figure 1:
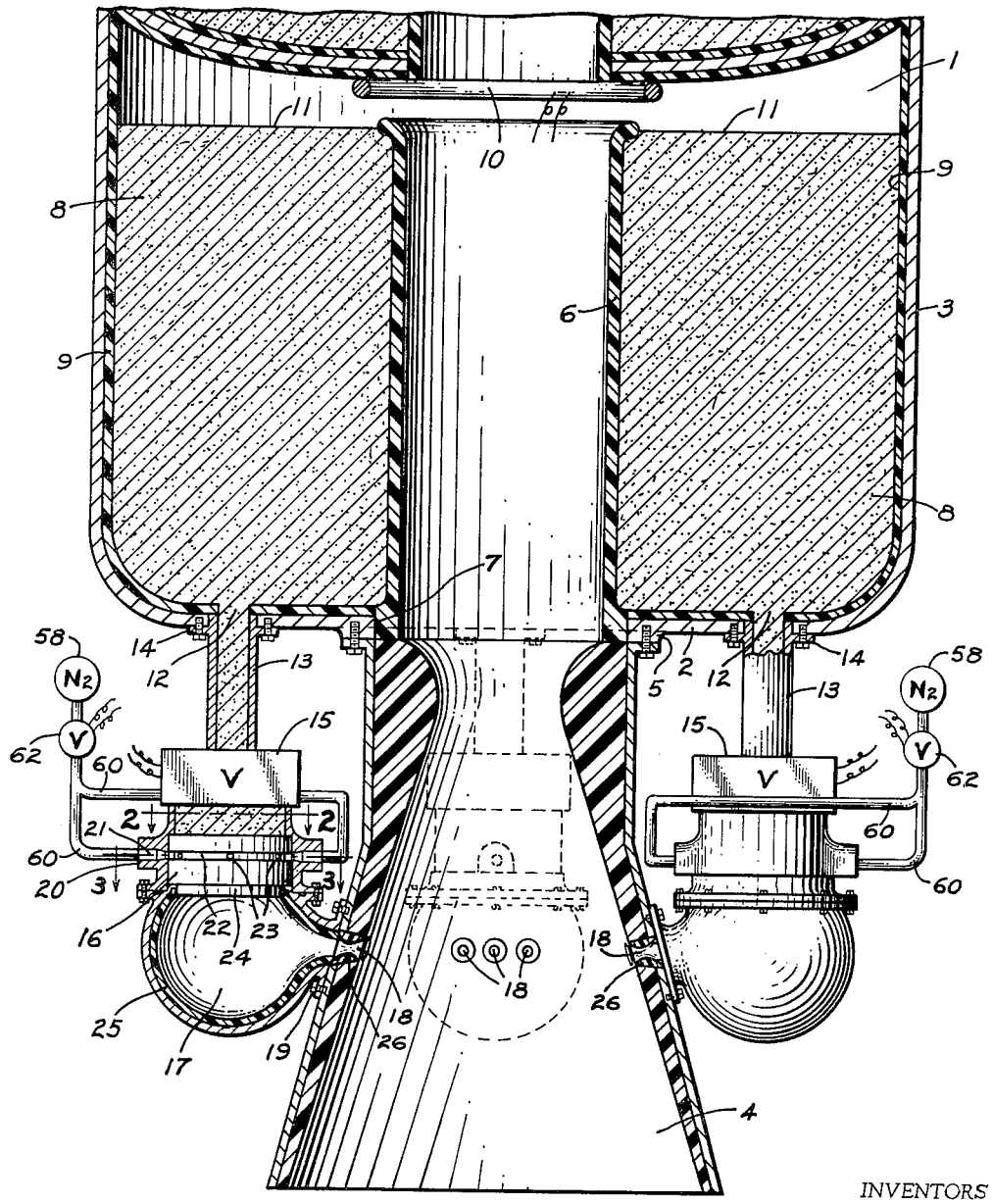
FIGURE 1 is a partial cross-sectional view of an embodiment of the invention showing a rocket motor in combination with a thrust-vector control system.

Broadly speaking the present invention discloses a thrust-vector-control system designed for use in combination with a rocket motor primarily of the type having a compartment for housing and burning a semi-solid propellant and a rearwardly directed nozzle. The control system comprises one or more gas generators which are fed this same semi-solid propellant by piping it from the propellant compartment under the pressure of the combustion gases therein. Within the gas generators the propellant is divided into a particulate spray and subsequently burned to form hot gases. These gases are then injected through apertures, formed in the rocket motor nozzle, into the flow path of the rocket motor exhaust gases to produce the desired side force.

Referring now to the drawings, FIGURE 1 shows diagrammatically a cross-section of the main rocket motor and thrust-vector-control system illustrative of the invention. The rocket motor is of the general type described in the Grover et al. application, Serial Number 111,396 filed May 19, 1961, now U.S. Patent No. 3,122,884, which shows a cylindrical motor casing having a plurality of compartments each containing a viscous pool of semi-solid monopropellant which burns on its upper or forward surface. In FIGURE 1 only the rearwardmost compartment is shown. The rear or lower compartment 1 is provided with a rear wall 2 here being shown as formed integral with the cylindrical motor casing 3. A conventional rearwardly-directed nozzle 4 is attached to the rear wall 2, as shown, in any suitable manner, as by bolting through nozzle flange 5. Exhaust stack 6 extends forwardly from rear wall 2 to which it is attached in suitable manner, as by adhesive bonding at 7, to a point spaced rearwardly from the top of compartment 1 and communicates rearwardly directly with nozzle 4. Tubular stack 6 also provides, in combination with rear wall 2 and side motor wall 3, a receptacle for receiving semi-solid monopropellant 8. The rear wall 2 has a plurality of openings 12 at which there are attached pipes 13, secured to the wall 2 in any suitable manner, as by bolting through flanges 14.

All of the interior surfaces of the main rocket motor which would be exposed to combustion gases are insulated with suitable insulating material 9. The exhaust stack 6 can be made of a metal shell insulated on both surfaces or of a rigid insulating material throughout as shown. Conventional igniter 10, such as an electrically initiated pyrogen igniter having a consumable case, is appropriately mounted in the compartment 1, as shown diagrammatically. The electrical lead wires can be attached to a source of electric current (not shown) outside the motor. The top surface 11 of the pool of semi-solid monopropellant provides an ignition surface which burns downward in the direction opposite to motor thrust. After ignition, the burning monopropellant produces high temperature, high pressure combustion gases within the compartment which vent through the exhaust stack 6 and the rearwardly-directed nozzle 4 to produce upward thrust.

In FIGURE 1, the exemplary system shown accommodates four hot-gas generators which would enable pitch and yaw control of the rocket. Two of the hot-gas generators are not shown, one being eliminated by this sectional view and the other being obscured, except for its nozzle openings 18, by the nozzle 4, but is still roughly outlined in broken-line form. Of the two hot-gas generators shown, just the one on the left of the drawing will be discussed, since all are identical in structure and operation. These hot-gas generators contain apparatus for transforming the propellant into a particulate spray. A particularly suitable gas generator containing spray-forming means is disclosed in our patent application Serial No. 150,833 entitled Gas Generator, filed November 7, 1961, and is discussed below.

Pipe 13 extends rearwardly to a metering means such as a conventional variable control valve 15. Aft of the control valve 15 is extrusion member 16, shown in detail in FIGURES 2 through 6. Positioned beneath the extrusion member 16 is the combustion chamber 17 which can be substantially spherical in shape, as shown, or oblong to accommodate one or more exhaust nozzles 18 positioned on its side surface. These nozzles 18 open into the main rocket nozzle 4 and are formed by retaining graphite inserts 26 in suitably cut apertures in the main nozzle 4. The graphite inserts 26 are shaped to provide sonic injection of the hot gases generated in combustion chamber 17. The combustion chamber 17 is attached to nozzle 4 by suitable means such as the bolts 19.

One or more bosses 20 are provided having a center tap 21 opening into an aligned annular slot 22 formed on the periphery of the extrusion member 16. Passageways 23 extend radially from the slot 22 toward the center of the extrusion member 16, this arrangement being better seen in FIGURE 3. Insulations 24 and 25 afford protection at the interior of the combustion chamber 17 from the hot combustion gases. A pressurized tank 58 of an inert gas such as nitrogen is connected to the center taps 21 by tubes 60, the flow of this inert gas being controlled by a conventional valve 62, which is capable of mechanical or electrical remote operation. Ingition of the propellant in chamber 17 is achieved by a conventional igniter such as a hot wire or hypergolic igniter, not shown. In the event that igniters are not used, ignition would be obtained by the residual heat from the main nozzle 4, or from the chamber 17 caused by previous operation of the hot-gas generator.

FIGURE 2 is a view of the inlet side of the extrusion member 16, taken on line 2—2 of FIGURE 1. The member 16 is shown as having seven circular passages 27 for receiving nozzle assemblies which have at their upstream end a retainer section 28. These retainer sections 28 have a passageway in the shape of a truncated cone 29 through which the propellant is extruded. Located in and attached to each cone 29 is a rigid, twisted swirl vane 30 that imparts rotation to the propellant as it is extruded through the cones 29 and out the downstream circular apertures 31. Here, by way of example, the swirl vanes are shown as having a 90° twist between their upper and lower ends so that the propellant is rotated approximately 90° during its passage through the cones 29, although it has been found that the normal amount of twist would be 10° to 20° depending upon the axial velocity of the monopropellant.

FIGURE 3 is a cross-sectional view of the gas generator along the line 3—3 of FIGURE 1. The passageways 23 formed in annular slot 22 open into and communicate with annular recesses 32 in the retainer sections 28. On the downstream face of the recesses 32 are arranged a plurality of smaller passageways 33 which extend downstream. In both FIGURES 2 and 3 the tubes 60 and their threaded coupling means together with other downstream apparatus which would normally be seen in these plan views have been eliminated for clarity.

FIGURE 4 is a cross-section through one passage 27 in the extrusion member 16 showing the arrangement of the nozzle assembly. The passageways 33 in each of the above-described retainer sections 28 communicate with an annular recess 34 on the upstream end of a vortex section 35. The upstream face of the vortex section 35 abuts the downstream face of the retainer section 28 which, due to their lapped surfaces, forms a gas-tight seal. Slots 36 extend tangentially from the recess 34 into a vortex chamber 37 which is in axial alignment with the downstream circular aperture 31 of retainer section 28. Recess 34 communicates with a further annular recess 38 through a plurality of passageways 39 in the vortex section 35. Recess 38 is formed with a downstream converging inside face 40. Ring 41 abuts the downstream face of vortex section 35 and is shaped to restrict the area of communication between the recess 38 and the combustion chamber 14 to form a downstream converging opening 42 coaxial about the vortex chamber 37 at its downstream end. Opening 42 can be varied by the use of rings 41 of varying inside diameters.

FIGURE 5 is an exploded view of the nozzle assembly. The swirl vane or deflector plate 30 is shown as being constructed to impart a clockwise rotation to the propellant being extruded. In the vortex section 35, the slots 36, shown tangential to the vortex chamber 37, are also arranged to exert a clockwise influence. The complete extrusion member 16 is formed by first inserting in each passage 27 a ring 41 until it abuts a shoulder located at the extreme downstream end of the passage. A vortex section 35 next follows until it abuts ring 41. The nozzle assembly is then completed and retained by inserting a retainer section 28 which is threaded to connect with a threaded portion of passage 27. When completely inserted, retainer section 28 abuts vortex section 35. FIGURE 6 is a downstream view of vortex section 35 showing how the slots 36 are arranged tangential to the vortex chamber 37.

During operation of the main rocket motor, the high pressure combustion gases produced by burning of the propellant in compartment 1 provide the finite stress necessary to induce flow of the propellant through pipes 13. The pressure within the compartment is commonly in the range of 500 p.s.i. to 1000 p.s.i. When thrust-vectoring is desired, valves 15 and 62 are actuated to permit the desired volume of propellant and inert gas respectively to reach the extrusion member 16. The propellant is forced to rotate in the cones 29 in extrusion member 16 by the presence of swirl vanes 30. The cone shape is preferred since it produces a lower pressure drop than would a cylinder having a constant inner diameter equal to the downstream circular aperture 31 and thus maximizes the mass flow which can be achieved for a given pressure differential between compartment 1 and combustion chamber 17. The higher the extrusion rate of the propellant as determined by the setting of valve 15, the greater will be the angular velocity of the propellant as it leaves the apertures 31 at the downstream end of the cones 29 and enters the vortex chambers 37.

Pressurized inert gas, such as nitrogen in the case of a monopropellant which generally contains sufficient oxidizer, is admitted into center taps 21 and passes to slot 22 in extrusion member 16. From here the gas proceeds into the pasageways 23 directly and also by way of the annular recesses 32 in the retainer sections 28. Gas is thus in contact with all of the nozzle assemblies and flows down the passageways 33 into the annular recesses 34 of the vortex sections 35, at which point it forms two separate flows.

Some of the inert gas, hereafter called vortex gas, is directed into slots 36 and enters the vortex chambers 37. Since the slots 36 are arranged tangentially to the vortex chambers, this vortex gas spins or swirls upon admission to the vortex chambers 37 and contacts the swirling propellant leaving the cones 29. The gas imparts additional rotation to the propellant and also performs a wiping function since it prevents the propellant from adhering to or clogging the sides of the vortex chambers 37 as the swirling mass of propellant and gas proceeds downstream. The diameter of the vortex chambers 37 is constructed larger than the diameter of the downsteam circular apertures 31 of the cones 29 to provide adequate space for the gas and additionally to provide space for the propellant to begin separating due to its rotational movement and the presence of the gas. The mass of swirling, partially-separated propellant then emerges from the vortex chamber and enters the combustion chamber 17, its natural tendency being to sling or spin outward due to its high rotational energy.

While the vortex gas is being directed into slots 36, the remaining inert gas is directed down passageways 39 into annular recesses 38 and out of opening 42 so that a wall of downward converging gas impinges upon the propellant emerging from each vortex chamber 37. This remaining gas restrains the tendency of the propellant to spin outward, chops up or atomizes the propellant, and controls the angle of the spray cone of propellant particles in the combustion chamber 17. This spray cone formed by the atomized propellant can be varied by the momentum of the remaining gas, which momentum is, in turn varied by regulating the pressure of the gas admitted to center taps 21 by the valve 62 connected to pressurized gas source 58. The angular velocity of the propellant leaving the vortex chamber 37 also helps to determine the configuration of the atomized propellant in the combustion chamber. This angular velocity can be varied by varying the extrusion rate of the propellant since the greater the extrusion rate, the greater will be the rotational effect exerted on the propellant by the swirl vanes 30. The velocity of the vortex gas admitted into the vortex chamber will also vary as the gas pressure is varied, but its rotational effect upon the propellant is substantially less than that of the swirl vanes 30. Thus, by controlling extrusion rate and gas pressure, the angle of the spray of atomized propellant can also be controlled. In practice, it is feasible to maintain the inert gas pressure approximately two times the maximum pressure in combustion chamber 17 to assure a high velocity delivery of inert gas into the vortex chamber 37 and out of the opening 42. The inert gas also functions as a coolant for the propellant and extrusion member 16 which reduces the danger of autoignition of the upstream portion of the extruding propellant due to heat transfer, and additionally protects the nozzle structure. The insulation 24 at the downstream end of the extrusion member 16 serves to minimize heat transfer from the combustion chamber 17 and reduces the amount of inert gas needed for cooling when the hot-gas generator is shut down.

The combustion of the propellant spray in the combustion chambers 17, creates the secondary hot-gas injectant which is used for thrust vectoring purposes. This hot gas exits through the one or more nozzles 18, here being shown as three, connected to each combustion chamber 17 and impinges on the primary exhaust stream in main nozzle 4.

The direction of the injection of the hot-gas into the main nozzle can be perpendicular to the longitudinal axis, as shown, or can be directed upwardly or downwardly with respect to this axis. The hot gas enters the main nozzle with great momentum and causes a shock wave to develop upstream of the injection port. This shock wave disturbs the flow of the primary exhaust stream, the result being the generation of a side force acting in the direction from which the injectant came. The total side force is a combination of this shock-wave effect and the reactive energy or thrust of the hot-gas injection through nozzles 18. The shock-wave effect can be considered to be an amplification of the reactive thrust since the force created is greater than that attributable to reactive thrust alone.

Since the high-energy level of a hot-gas injectant does produce a large reactive force in addition to the shock-wave amplification discussed above, the hot-gas injection approach is considered to be the most desirable when compared with liquid and cold-gas secondary injection systems. While the there are other ways of obtaining high-energy gases such as by bleeding or tapping the gases in the combustion chamber of the main rocket, such a system reduces rocket performance and requires high temperature insulation throughout the piping system as well as a valving system capable of operation in the high temperature environment during the full-burning cycle of the main rocket motor. And if provision is made to cool the gases to overcome these problems then the advantage of a high-energy level gas is lost and the system is additionally burdened by the added weight of the cooling means. Thus the present invention discloses the manner of obtaining the most desired secondary-injection thrust-vector-control technique, i.e., hot gas injection, without having to be burdened by the problems that heretofore faced those skilled in this art.

This system is even capable of using a propellant having properties, such as specific impulse or burning rate, different from those of the propellant used by the main rocket motor. This of course is obviously a feature which cannot be matched by chamber bleed systems. FIGURE 7 discloses a system designed to contain two layers of propellants having different properties. Disposed beneath the propellant 8, which is used for propulsion of the main rocket, is a layer of propellant 50 which is fed through pipes 13 into the hot-gas generators when thrust-vectoring is desired. The volume of propellant 50 necessary for thrust-vectoring will be calculated prior to flight. If any excess remains it can be burned to produce thrust following the combustion of propellant 8, or if this is undesirable, provision can be made to dump the excess overboard or even to extrude it to an auxiliary gas generator with a rearwardly directed nozzle, thus supplementing the thrust of the rocket.

FIGURE 7 also shows a modification of the manner of attaching pipes 13 to rear wall 2. An annular manifold 51 generally semicircular in cross-section is attached by welding or other means to the inner wall 52 of a recess formed in the rear wall 2. Opening into this manifold 51 through the inner wall 52 are apertures 53 spaced at a plurality of points around the periphery of the wall 52 and through which the propellant 50 flows into the manifold. Pipes 13 are attached to the manifold through conventional pipe couplers 54 which extend inwardly from the manifold. By providing this manifold arrangement with a plurality of apertures opening into the propellant compartment, the propellant will flow first into the manifold from a plurality of points and then through the pipes 13 which are in open communication with this manifold. This arrangement consequently eliminates what might be an undesirable characteristic of the embodiment of FIGURE 1, namely, that the propellant flowing into pipes 13 would come from one point, i.e., from a point directly above the opening 12. The result of this might be the formation of a crater on the top surface 11 of the propellant, increasing its burning surface and upsetting the pre-planned mass rate of gas generation in the main rocket.

When thrust-vectoring in either of the embodiments shown in FIGURES 1 and 7 is no longer desired, propellant extrusion is terminated by closing control valve 15. The inert vortex gas wipes the propellant in the vortex chambers 37 out into the combustion chamber 17 where it is consumed. Shutdown is abrupt. The inert gas also blocks any tendency of the flame to burn back into the extrusion member 16 or pipe 13. After shutdown, the inert gas flow can be reduced by regulating valve 62 since the gas will now serve mainly as a coolant to prevent any heat in the combustion chamber 17, which will remain for a definite period of time above the autoignition point of the propellant, from being transferred upstream.

When thrust-vectoring is again desired restart of the hot-gas generator is instantaneous. The desired extrusion rate and inert gas flow is selected by proper manipulation of valves 15 and 62 and the propellant is sprayed once again into the combustion chamber 17. The start-stop capability is virtually unlimited, being restricted only by the durability of the combustion chamber insulation liner 25, because the inert gas and the insulation 24 prevent flame and hot combustion gases from contacting the extrusion member 16 and its nozzle assemblies, thereby eliminating the possibility of damage to the apparatus. Upon restarting, ignition can be provided by the igniter, not shown, or by the residual heat within the chamber 17 or main nozzle 4.

If in the embodiment showing of FIGURE 7 separate layers of propellants a high stoichiometry is desired, but the propellant 50 is incapable of being loaded with sufficient solid oxidizer without destroying the requisite cohesiveness and fluidity of the composition, the aforedescribed inert gas can be replaced by an oxidizing gas such as oxygen or air which would provide additional oxidizer to permit the attainment of the high stoichiometric level. If a bipropellant system is used in the hot-gas generators the same substitution of an oxidizer such as oxygen or air, for the inert gas can be made. The fuel for the bipropellant system would be the layer 50. There are distinct advantages to be gained by using such a bipropellant system. The fuel 50, since it will not burn without an oxidizer, eliminates the danger of burn-back into the extrusion member 16 or pipe 13. Additionally, when the burning surface 11 of the main propellant 8 reaches the layer of fuel 50, combustion in compartment 1 will terminate. This is a great aid to the engineer in planning the rocket flight because it enables the design of a thrust curve having no tail-off. It would only require that the depth of layer 50 be sufficient to provide fuel for thrust-vectoring needs and still have its top surface at or above the plane where its surface area would begin to diminish rapidly.

In FIGURE 1 the nozzles 18 are shown as being directed toward the longitudinal axis of the rocket. Thus, in this embodiment there would be only pitch and yaw control of the rocket since there can be no moment arm created about the longitudinal axis to provide roll control. If the main rocket, as is often the case, has multiple exhaust nozzles 4 positioned about its longitudinal axis, then roll control can be realized because the injection nozzles 18 in each main nozzle 4 would be offset with respect to the longitudinal axis of the rocket thus creating the necessary moment arm upon acuation of a hot-gas generator. It is also well known to provide cusps or triangular ridges within a main nozzle 4 and have the nozzles 18 opening into the nozzle 4 through the sides of the cusps. This offsets the nozzles with respect to the longitudinal axis of the rocket to create a moment arm when a hot-gas generator is actuated.

The metering means 15 can be a conventional variable valve, such as a variable contrictor, or a pump such as a rotary peristaltic pump if an extrusion rate greater than that attainable by the pressure within compartment 1 is desired. In practice the metering means 15 and the inert gas valve 62 are generally incorporated into a conventional servo system to respond to thrust-vector command signals.

Both the motopropellant and the fuel used in a bipropellant system are preferably extrudible thixotropic paste-like masses which require a finite stress to produce flow, are capable of continuous flow at ambient temperatures under a maximum shear stress at a wall of 10 p.s.i., and have a minimum tensile strength of about 0.01 p.s.i. Many different compositions tailored to different performance requirements can be made having these desired physical characteristics. Examples of these compositions are available in our copending application Serial No. 150,833, mentioned previously.

While this application has been drawn to particular exemplary embodiments, it is obvious that various changes or modifications will occur to those skilled in the art which will fall within the spirit and scope of the invention as described in the following claims.

We claim:
1. In a rocket motor having a rearwardly-directed nozzle and a compartment housing a semi-solid monopropellant for burning therein, a thrust-vector-control system for maneuvering the rocket motor comprising, an extrusion member, a passageway connecting said compartment to said extrusion member thereby providing a flow path for said monopropellant to said extrusion member, a combustion chamber positioned downstream of said extrusion member wherein said extruded monopropellant is burned to form combustion gases, outlet means in said combustion chamber opening transversely into said rearwardly-directed nozzle for directing said combustion gases into the normal exhaust path through said nozzle, and metering means positioned in said passageway for controlling the flow of monopropellant to said extrusion member.

2. In a rocket motor having a rearwardly-directed nozzle and a compartment housing a semi-solid propellant for burning therein, a thrust-vector-control system for maneuvering the rocket motor comprising, an extrusion member having at least one passage through which said propellant is extruded and means associated with said passage for dividing said propellant into a particulate spray, a passageway connecting said compartment to said extrusion member thereby providing a flow path for said propellant to said extrusion member, a combustion chamber positioned downstream of said extrusion member wherein said particulate spray is burned to form combustion gases, and outlet means in said combustion chamber opening transversely into said rearwardly-directed nozzle for directing said combustion gases into the normal exhaust path through said nozzle.

3. In a rocket motor having a rearwardly-directed nozzle and a compartment housing a semi-solid propellant for burning therein, a thrust-vector-control system for maneuvering the rocket motor comprising, an extrusion member having at least one passage through which said propellant is extruded and means associated with said passage for dividing said propellant into a particulate spray, a passageway connecting said compartment to said extrusion member thereby providing a flow path for said propellant to said extrusion member, a combustion chamber positioned downstream of said extrusion member wherein said particulate spray is burned to form combustion gases, outlet means in said combustion chamber opening transversely into said rearwardly-directed nozzle for directing said combustion gases into the normal exhaust path through said nozzle, and metering means positioned in said passageway for controlling the flow of propellant to said extrusion member.

4. A device as claimed in claim 3 wherein said passage in said extrusion member is formed in part in the shape of a truncated cone, said truncated cone opening downstream at its truncated end into the remainder of said passage which serves as a vortex chamber.

5. A device as claimed in claim 4 wherein said dividing means associated with said passage comprises ports positioned substantially tangential to said passage portion which serves as a vortex chamber, said ports being positioned at the upstream end of said vortex chamber and used for introducing a vortex gas against said propellant, and means adjacent to the downstream end of said vortex chamber for introducing a second gas transversely against said propellant as it emerges from said vortex chamber.

6. A device as claimed in claim 5 further comprising a mechanical member positioned in said cone, said mechanical member imparting rotation to said propellant.

7. In a rocket motor having a rearwardly-directed nozzle and a compartment housing a semi-solid extrudible propellant for burning therein, a thrust-vector-control system for controlling the attitude of the rocket motor comprising: an extrusion member having a plurality of passages through which said propellant is extruded and means associated with each passage for dividing said propellant into a particulate spray, a passageway connecting said compartment to said extrusion member to provide a path for the flow of propellant to said extrusion member said flow being caused primarily by the pressure of combustion gases within said rocket motor, a combustion chamber positioned downstream of said extrusion member wherein said particulate spray is burned to form secondary combustion gases, outlet means in said combustion chamber opening transversely into said rearwardly-directed nozzle for directing said secondary combustion gases into the exhaust path of the rocket motor combustion gases and a flow regulator positioned in said passageway for controlling the flow of propellant to said extrusion member.

8. A device as claimed in claim 7 wherein each passage in said extrusion member is formed in part in the shape of a truncated cone, said truncated cone opening downstream at its truncated end into the remainder of said passage which serves as a vortex chamber.

9. A device as claimed in claim 8 wherein said dividing means associated with each passage comprises ports positioned substantially tangential to the passage portion which serves as a vortex chamber, said ports being positioned at the upstream end of the vortex chamber and used for introducing a vortex gas against said propellant, and means adjacent to the downstream end of the vortex chamber for introducing a second gas transversely against said propellant as it emerges from said vortex chamber.

10. A device as claimed in claim 9 wherein said truncated cone is shaped to impart rotation to said propellant.

11. A device as claimed in claim 3 wherein said particulate spray is an atomized spray.

12. A device as claimed in claim 7 wherein said particulate spray is an atomized spray.

13. A device as claimed in claim 5 further comprising a source of supply for said vortex gas and second gas and means for regulating the flow of said vortex gas and second gas from said source to said extrusion member.

14. A device as claimed in claim 9 further comprising a source of supply for said vortex gas and second gas and means for regulating the flow of said vortex gas and second gas from said source to said extrusion member.

15. In a rocket motor having a rearwardly-directed nozzle and a compartment housing a semi-solid propellant for burning therein, a thrust-vector-control system for controlling the attitude of the rocket motor comprising, a plurality of gas generators, each gas generator comprising an extrusion member having a plurality of passages through which said propellant is extruded and means associated with each passage for dividing said propellant into a particulate spray, a combustion chamber positioned downstream of said extrusion member wherein said particulate spray is burned to form secondary combustion gases and outlet means in said combustion chamber opening transversely into said rearwardly-directed nozzle for directing said secondary combustion gases into the exhaust path of the rocket motor combustion gases, passageways connecting said compartment to the extrusion member in each gas generator to provide a path for the flow of propellant to the extrusion member, and a flow regulator positioned in each passageway for controlling the flow of propellant to each extrusion member.

16. A device as claimed in claim 15 further comprising a source of gas, means for connecting said source to said extrusion member and means for regulating the flow of said gas to said extrusion member.

17. In a rocket motor having a rearwardly-directed nozzle and a compartment housing a semi-solid propellant for burning therein, a thrust-vector-control system for controlling the attitude of the rocket motor comprising a plurality of gas generators, each gas generator having means for dividing said propellant into a particulate spray, a combustion chamber positioned downstream of said dividing means wherein said particulate spray is burned to form secondary combustion gases and outlet means in said combustion chamber opening transversely into said rearwardly-directed nozzle for directing said secondary combustion gases into the exhaust path of the rocket motor combustion gases, passageways connecting said compartment to the gas generators to provide paths for the flow of propellant to the dividing means, and metering means positioned in the flow paths to control the flow of propellant to the dividing means.

18. A combination of a rocket motor and a thrust-vector-control system, said rocket motor having a rearwardly-directed nozzle and a compartment housing a semi-solid extrudible, paste-like fuel for burning therein, said fuel being in horizontally disposed layers having different burning properties, said system comprising a gas generator for generating secondary combustion gases and means for directing said gases into said rearwardly-directed nozzle transversely into the exhaust path of the rocket motor combustion gases and means for feeding the fuel from one of said layers to said gas generator.

19. A combination as claimed in claim 18 further comprising a source of oxidizing gas and means for feeding said oxidizing gas to said gas generator to aid in the combustion of fuel fed to said gas generator.

20. A combination as claimed in claim 19, said gas generator having means for dividing said fuel into a particulate spray in which form it is burned to generate said secondary combustion gases.

References Cited by the Examiner
UNITED STATES PATENTS 3,092,963    6/1963    Lawrence            60—35.54

FOREIGN PATENTS 1,197,701    6/1959    France.

OTHER REFERENCES

Norvad Report 6548, "Thrust-Vectoring Experiments With Gas Injection," reproduced by the Armed Services Technical Information Agency, page 14 relied on.

MARK NEWMAN, *Primary Examiner.*

SAMUEL FEINBERG, *Examiner.*

G. L. PETERSON, A. L. SMITH, *Assistant Examiners.*